United States Patent
Shao et al.

(10) Patent No.: US 12,346,866 B2
(45) Date of Patent: Jul. 1, 2025

(54) METHODS FOR SHARED BICYCLE DELIVERY AND OPERATION AREA PLANNING IN SMART CITIES AND INTERNET OF THINGS (IOT) SYSTEMS THEREOF

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yongzeng Liang, Chengdu (CN); Xiaojun Wei, Chengdu (CN); Zhihui Wen, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 205 days.

(21) Appl. No.: 18/151,448

(22) Filed: Jan. 8, 2023

(65) Prior Publication Data
US 2023/0153742 A1    May 18, 2023

(30) Foreign Application Priority Data
Dec. 20, 2022   (CN) .......................... 202211635862.2

(51) Int. Cl.
| | |
|---|---|
| *G06Q 10/08* | (2024.01) |
| *G06Q 10/083* | (2023.01) |
| *G06Q 30/0202* | (2023.01) |
| *G16Y 10/40* | (2020.01) |
| *G16Y 40/60* | (2020.01) |

(52) U.S. Cl.
CPC ....... *G06Q 10/083* (2013.01); *G06Q 30/0202* (2013.01); *G16Y 10/40* (2020.01); *G16Y 40/60* (2020.01)

(58) Field of Classification Search
CPC ...................................................... G06Q 10/08
USPC ...................................................... 705/7.31
See application file for complete search history.

(56) References Cited

U.S. PATENT DOCUMENTS

| | | | |
|---|---|---|---|
| 2022/0198196 A1* | 6/2022 | Beaurepaire ............ | G06F 16/29 |
| 2022/0198351 A1* | 6/2022 | Beaurepaire ............. | G06N 3/08 |
| 2023/0245223 A1* | 8/2023 | Okai .................. | G06Q 30/0261 |
| | | | 705/307 |
| 2023/0386335 A1* | 11/2023 | Beaurepaire ........... | G08G 1/065 |

FOREIGN PATENT DOCUMENTS

| | | |
|---|---|---|
| CN | 107909731 A | 4/2018 |
| CN | 107767659 B | 1/2021 |
| CN | 109190813 B | 5/2022 |

\* cited by examiner

*Primary Examiner* — Nga B Nguyen
(74) *Attorney, Agent, or Firm* — METIS IP LLC

(57) ABSTRACT

The embodiments of the present disclosure provide a method for a shared bicycle delivery and an operation area planning in a smart city and an Internet of Things (IoT) system thereof. The method may be implemented based on a management platform of the Internet of Things (IoT) system. The method includes: obtaining reference information of people flow in at least one target area, determining a predicted people flow in the at least one target area at a target time, and determining a demand quantity for shared bicycles; obtaining historical data of shared bicycles in a plurality of reference areas, and predicting a variation quantity of shared bicycles in the at least one target area at the target time; and determining a delivery quantity of shared bicycles in the at least one target area at the target time.

17 Claims, 8 Drawing Sheets

200

```
┌─────────────────────────────────────────────────┐
│ Obtaining reference information of people flow │
│ in at least one target area, determining a      │   210
│ predicted people flow in the at least one       │
│ target area at a target time based on the       │
│ reference information of people flow, and       │
│ determining the demand quantity for shared      │
│ bicycles based on the predicted people flow     │
└─────────────────────────────────────────────────┘
                         │
                         ▼
┌─────────────────────────────────────────────────┐
│ Obtaining historical data of the shared         │   220
│ bicycles in a plurality of reference areas,     │
│ and predicting the variation quantity of        │
│ shared bicycles in the at least one target      │
│ area at the target time based on the            │
│ historical data of shared bicycles              │
└─────────────────────────────────────────────────┘
                         │
                         ▼
┌─────────────────────────────────────────────────┐
│ Determining a delivery quantity of shared       │   230
│ bicycles in the at least one target area at     │
│ the target time based on the demand quantity    │
│ for shared bicycles and the variation quantity  │
│ of shared bicycles                              │
└─────────────────────────────────────────────────┘
```

FIG. 2

METHODS FOR SHARED BICYCLE DELIVERY AND OPERATION AREA PLANNING IN SMART CITIES AND INTERNET OF THINGS (IOT) SYSTEMS THEREOF

CROSS-REFERENCE TO RELATED DISCLOSURES

This application claims the priority of the Chinese application No. 202211635862.2 filed on Dec. 20, 2022, the entire content of which is incorporated herein by reference.

TECHNICAL FIELD

This disclosure relates to the technical field of the Internet of Things, and in particular to a method for a shared bicycle delivery and an operation area planning in a smart city and an Internet of Things (IoT) system.

BACKGROUND

With the development of sharing economy, shared bicycles have increasingly become a popular way for people to travel. However, with the increase in a number of users of shared bicycle, a number of shared bicycles delivered by related companies is also increasing. There are countless users of shared bicycle traveling around the city every day, and different users have different needs for shared bicycles at different times, which has brought more and more challenges to operation and management of shared bicycles. How to realize a reasonable delivery, scheduling, and operation of shared bicycles and reduce operation and management costs are urgent problems to be solved.

Therefore, it is desirable to propose a method for a shared bicycle delivery and an operation area planning in a smart city and an Internet of Things (IoT) system to realize automation and intelligence of the operation and management of shared bicycles.

SUMMARY

One or more embodiments of this disclosure provide a method for a shared bicycle delivery and an operation area planning in a smart city. The method is implemented based on a management platform of an Internet of Things (IoT) system for a shared bicycles delivery and an operation area planning in a smart city. The method includes: obtaining reference information of people flow in at least one target area, determining a predicted people flow in the at least one target area at a target time based on the reference information of people flow, and determining a demand quantity for shared bicycles based on the predicted people flow; obtaining historical data of shared bicycles in a plurality of reference areas, and predicting a variation quantity of shared bicycles in the at least one target area at the target time based on the historical data of shared bicycles; and determining a delivery quantity of shared bicycles in the at least one target area at the target time based on the demand quantity for shared bicycles and the variation quantity of shared bicycles.

One or more embodiments of the present disclosure provide an Internet of Things (IoT) system for a shared bicycle delivery and an operation area planning in a smart city. The system includes a user platform, a service platform, a management platform, a sensor network platform, and an object platform. The service platform includes a plurality of service sub-platforms, and different target areas correspond to different service sub-platforms. The management platform includes a general management platform database and a plurality of management sub-platforms, and each of the plurality of management sub-platforms corresponds to each of the different target areas. The sensor network platform includes a plurality of sensor network sub-platforms, and each of the plurality of sensor network sub-platforms corresponds to the each of the different target areas. The object platform is configured to obtain reference information of people flow in a target area and historical data of shared bicycles in a reference area, and transmit the reference information and the historical data to a corresponding management sub-platform based on a sensor network sub-platform corresponding to the target area. The management sub-platforms are configured to determine a predicted people flow in the target area at a target time based on the reference information of people flow, and determine a demand quantity for shared bicycles based on the predicted people flow; determine a variation quantity of shared bicycles in the target area at the target time based on historical data of shared bicycles; determine a delivery quantity of shared bicycles based on the demand quantity for shared bicycles and the variation quantity of shared bicycles; and transmit the delivery quantity of shared bicycles to the service platform based on the general management platform database. The service platform is configured to transmit the delivery quantity of shared bicycles to the user platform.

One or more embodiments of the disclosure provide a non-transitory computer-readable storage medium storing computer instructions, after reading the computer instructions in the storage medium, a computer executes the method for the shared bicycle delivery and the operation area planning in the smart city in any one of the foregoing embodiments.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2 is a flowchart illustrating an exemplary method for a shared bicycle delivery and an operation area planning in a smart city according to some embodiments of the present disclosure;

DETAILED DESCRIPTION

Figure 1:
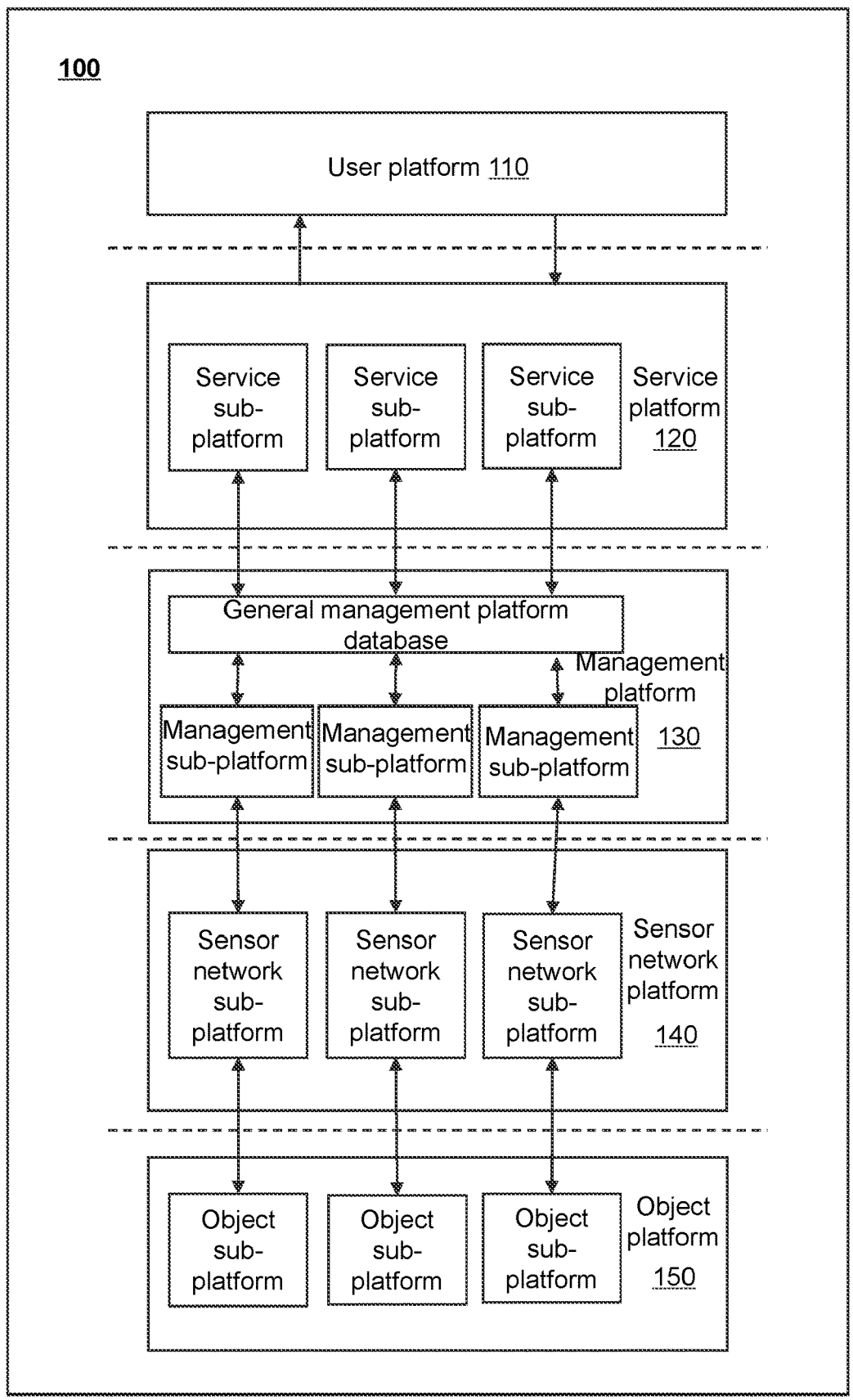
FIG. 1 is a structure diagram illustrating an exemplary platform of an Internet of Things (IoT) system for a shared bicycle delivery and an operation area planning in a smart city according to some embodiments of the present disclosure.

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit", and/or "module" used herein are one method to distinguish different components, elements, parts, sections, or assemblies of different levels in ascending order. However, the terms may be displaced by other expressions if they may achieve the same purpose As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is a structure diagram illustrating an exemplary platform of an Internet of Things (IoT) system for a shared bicycle delivery and an operation area planning in a smart city according to some embodiments of the present disclosure. In some embodiments, the Internet of Things (IoT) system 100 for the shared bicycles delivery and the operation area planning of in the smart city may include a user platform 110, a service platform 120, a management platform 130, a sensor network platform 140, and an object platform 150.

The user platform 110 may be a user-oriented service interface. In some embodiments, the user platform 110 may receive information from a user and/or the service platform. For example, the user platform 110 may receive an input from the user. As another example, the user platform 110 may receive information fed back to the user from the service platform, such as a delivery quantity of shared bicycles in a target area, an adjustment strategy of operation area, etc. In some embodiments, the user platform 110 may be configured to provide a feedback on received information to the user. In some embodiments, the user platform 110 may be configured to send data and/or an instruction to the service platform, for example, the user platform 110 may send an instruction for determining the adjustment strategy of operation area.

The service platform 120 may be a platform for preliminarily processing information. In some embodiments, the service platform may be configured to interact with the user platform and the management platform for information and/or data. For example, the service platform 120 may obtain a query instruction for the delivery quantity of shared bicycles inputted by the user from the user platform 110, upload the delivery quantity of shared bicycles to the user platform 110, etc. As another example, the service platform 120 may send the query instruction for the delivery quantity of shared bicycles to the management platform 130, obtain the delivery quantity of shared bicycles and the adjustment strategy of operation area from the management platform 130, etc.

In some embodiments, the service platform 120 may include a plurality of service sub-platforms, and different target areas correspond to different service sub-platforms. In some embodiments, at least one of the plurality of service sub-platforms may send the query instruction for the delivery quantity of shared bicycles in a corresponding target area to the management platform 130 to obtain the delivery quantity of shared bicycles in the corresponding target area. In some embodiments, at least one of the plurality of service sub-platforms may upload the delivery quantity of shared bicycles in the corresponding target area to the user platform 110.

The management platform 130 may refer to an Internet of Things (IoT) platform that plans and coordinates the connection and cooperation between various functional platforms and provides perception management and control management. In some embodiments, the management platform 130 may determine a predicted people flow in the at least one target area at the target time based on reference information of people flow, and determine a demand quantity for shared bicycles based on the predicted people flow. In some embodiments, the management platform 130 may predict a variation quantity of shared bicycles in the at least one target area at the target time based on historical data of shared bicycles. In some embodiments, the management platform 130 may determine the delivery quantity of shared bicycles in the at least one target area at the target time based on the demand quantity for shared bicycles and the variation quantity of shared bicycles. In some embodiments, the management platform 130 may adjust the operation area of shared bicycles at the target time based on real-time operation reference data.

For more contents about determining the predicted people flow, the variation quantity of shared bicycles, the delivery quantity of shared bicycles, and determining the adjustment strategy of operation area, please refer to FIGS. 3-8 and related descriptions thereof.

In some embodiments, the management platform 130 may include a general management platform database and a plurality of management sub-platforms. In some embodiments, each of the plurality of management sub-platforms corresponds to a different target area, and the each of the plurality of management sub-platforms may determine relevant information of the corresponding target area at the target time based on the data and/or information of the corresponding target area uploaded by the sensor network platform. For example, each management sub-platform may determine the predicted people flow in the corresponding target area at the target time based on the reference information of people flow in the corresponding target area uploaded by the sensor network platform. As another example, each management sub-platform may determine the variation quantity of shared bicycles in the corresponding target area at the target time based on the historical data of shared bicycles in the reference area corresponding to the target area uploaded by the sensor network platform.

In some embodiments, each management sub-platform may upload determined delivery quantity of shared bicycles in the corresponding target area and determined adjustment strategy of operation area to the general management platform database. In some embodiments, the general management platform database may upload the delivery quantity of shared bicycles and the adjustment strategy of operation area to the service platform in aggregate or by area.

The sensor network platform 140 may be a platform that realizes the interaction between the management platform and the object platform. In some embodiments, the sensor network platform 140 may receive instructions for obtaining the reference information of people flow, the historical data of shared bicycles, and reference data of operation implementation sent by the management platform, and send the instructions to the object platform. In some embodiments, the sensor network platform 140 may receive the reference information of people flow, the historical data of shared bicycles, and the reference data of operation implementation from the object platform, and upload the received reference information of people flow, the received historical data of shared bicycles, and the received reference data of operation implementation to the management platform.

In some embodiments, the sensor network platform 140 may include a plurality of sensor network sub-platforms, and each of the plurality of sensor network sub-platforms corresponds to a different target area. In some embodiments, each sensor network sub-platform has a one-to-one correspondence with each management sub-platform and each object sub-platform.

In some embodiments, each sensor network sub-platform may perform information and/or data interaction with the corresponding management sub-platform and the corresponding object sub-platform. For example, each sensor network sub-platform may receive instructions for obtaining the reference information of people flow, the historical data of shared bicycles, and the reference data of operation implementation sent by the corresponding management sub-platform, and send the instructions to the corresponding object sub-platform. As another example, each sensor network sub-platform may receive and upload the reference information of people flow, the historical data of shared bicycles, and the reference data of operation implementation uploaded by the corresponding object sub-platform to the corresponding management sub-platform.

The object platform 150 may be a functional platform for the generation of perception information and the final execution of control information. In some embodiments, the object platform 150 may be configured as a monitoring device to obtain the reference information of people flow, the historical data of shared bicycles, and the reference data of operation implementation. For example, the object platform 150 may obtain shared bicycle transfer data and variation data of the people flow based on road surveillance cameras in the target area, etc. In some embodiments, the object platform 150 may include object sub-platforms corresponding to different target areas, and each object sub-platform may be implemented by a monitoring device or a sensing device. The object sub-platforms corresponding to different areas may upload collected reference information of people flow, historical data of shared bicycles, and reference data of operation implementation to the corresponding sensor network sub-platforms, and the sensor network sub-platforms may upload the collected reference information of people flow, historical data of shared bicycles, and reference data of operation implementation to the management sub-platforms for processing. Different management sub-platforms may send instructions for collecting the reference information of people flow, the historical data of shared bicycles, and the reference data of operation implementation in the corresponding area to the corresponding object sub-platforms based on the corresponding sensor network sub-platforms, and the corresponding object sub-platforms may execute the instructions.

It should be noted that the above descriptions of the Internet of Things (IoT) system for the shared bicycles delivery and the operation area planning in the smart city and platforms thereof are only for convenience of description, and not limit the present disclosure to the scope of the embodiments. It can be understood that for those skilled in the art, after understanding the principle of the Internet of Things system, various platforms may be combined arbitrarily, or may form a subsystem to connect with other platforms without departing from the principle.

FIG. 2 is a flowchart illustrating an exemplary method for a shared bicycle delivery and an operation area planning in a smart city according to some embodiments of the present disclosure. In some embodiments, a process 200 may be performed by the management platform 130. As shown in FIG. 2, the process 200 includes the following steps.

Step 210, obtaining reference information of people flow in at least one target area, determining a predicted people flow in the at least one target area at a target time based on the reference information of people flow, and determining the demand quantity for shared bicycles based on the predicted people flow.

The target area may refer to an area where operation and management of shared bicycles are required. For example, the target area may be an area where the shared bicycles are delivered, such as a residential area, office area, subway entrance, hospital, school, business district, scenic spot, etc.

The reference information of people flow may refer to relevant information that affects variation in the people flow. For example, different weather may affect the travel of people, which in turn affects the people flow outdoors. Different popularity of the area may also attract different people and bring different people flows.

In some embodiments, the reference information of people flow may include at least one of popularity, weather information, social activity information, and area type of the at least one target area.

The popularity of the target area may refer to a degree of attention and preference of people on the target area. In some embodiments, the popularity of the target area may be obtained through a city popularity map. In some embodiments, the popularity of the target area may also be obtained through a degree of attention and collection of a user on a third-party platform (e.g., a travel information platform).

The weather information may refer to weather-related information of the target area at the target time. The weather information may include temperature, rainfall, sunshine, etc. In some embodiments, the weather information may be obtained through a third-party platform (e.g., a weather forecast platform) related to climate.

The social activity information may refer to various public activity information held in the target area. The social activity information may include activity time, activity location, activity scale, activity people number, etc. In some embodiments, the social activity information may be obtained through a relevant government activity management approval platform, or obtained based on a relevant media platform (e.g., official accounts, microblog, etc.) of the activity organizer.

The area type may refer to a type to which the target area belongs, such as office areas, residential areas, entertainment places, public service places, etc. In some embodiments, the type of the target area may be determined based on a corresponding function of the target area. In some embodiments, the type of the target area may be obtained through a third-party platform (e.g., a housing construction department). In some embodiments, different types of target areas may have different people flows at different times. For example, the people flow at a subway entrance during a rush hour is greater than that during a plain hour, and the people flow at the entertainment places during a rush hour is less than that during a plain hour.

The target time may refer to a time period during which operation and management of shared bicycles are required. The target time may be a future time period based on the current time. For example, the target time may be 1 hour, 2 hours, 3 hours, one day in the future of the current time, etc.

The current time may refer to an actual time of the current moment. The historical time, the target time, and the future time described in the embodiments of the present disclosure are all determined based on the current time.

The predicted people flow may refer to a people flow in the target area at the target time predicted based on the reference information of people flow. For example, the predicted people flow may be a people flow of Tiananmen Square on Oct. 1, 2026 predicted based on the reference information of people flow on Oct. 1, 2025.

In some embodiments, the management platform 130 may perform statistical analysis on the reference information of people flow at a second historical time corresponding to the target time to determine the predicted people flow. The second historical time may refer to a time period corresponding to the target time before a certain period (e.g., one year, one month, etc.) of the target time. For example, if the target time is 8:00-9:00 on Oct. 1, 2025, the second historical time may be one year ago, that is, the second historical time may be 8:00-9:00 on Oct. 1, 2024. For example, the people flow in the target area at the second historical time corresponding to the target time may be used as the predicted people flow.

In some embodiments, the management platform 130 may output the predicted people flow in the at least one target area at the target time through a first prediction model based on the reference information of people flow. In some embodiments, the management platform 130 may determine a reference information sequence of people flow based on the reference information of people flow of the plurality of target areas in the at least one target area; and output a predicted people flow sequence through the first prediction model based on the reference information sequence of people flow. Each element in the predicted people flow sequence may correspond to each target area in the plurality of target areas one-to-one. For more contents about determining the predicted people flow based on the first prediction model, please refer to FIG. 3 and related descriptions thereof.

The demand quantity for shared bicycles may refer to a number of shared bicycles that meet the riding needs of people in the target area.

In some embodiments, the management platform 130 may determine a riding ratio based on a historical people flow and a historical number of riders, and then determine the demand quantity for shared bicycles based on a product of the predicted people flow and the riding ratio. For example, if the riding ratio determined based on the historical people flow in a certain area is 40%, and the predicted people flow is 10,000, it may be determined that the demand quantity for shared bicycles in the certain area is 4,000.

In some embodiments, the management platform 130 may determine the demand quantity for shared bicycles based on the first prediction model. In some embodiments, the first prediction model includes a people flow prediction layer and a demand quantity prediction layer. The people flow prediction layer is configured to process the reference information of people flow to determine the predicted people flow. The demand quantity prediction layer is configured to process the predicted people flow to determine the demand quantity for shared bicycles in the at least one target area.

Figure 4:
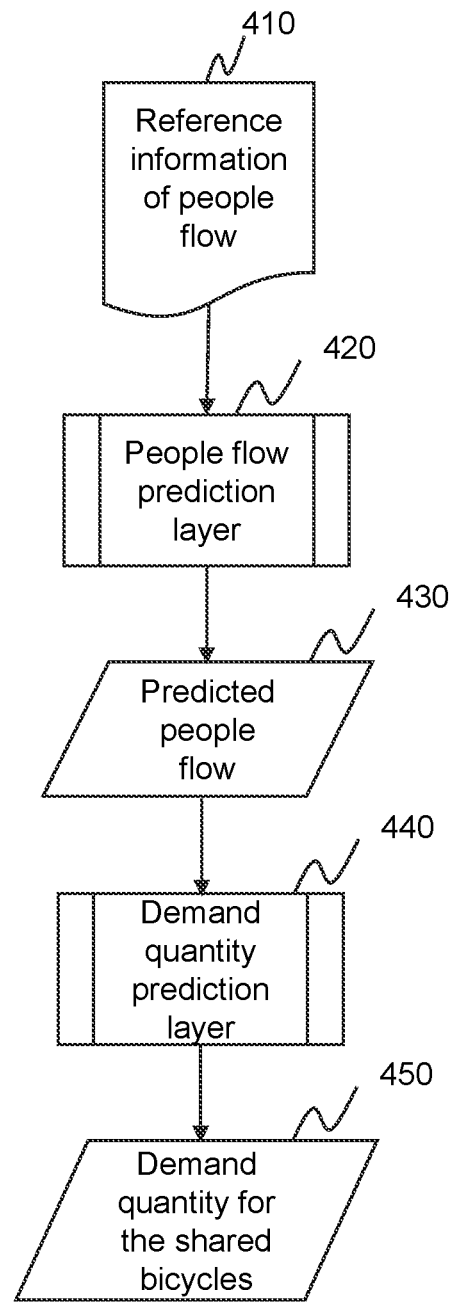
FIG. 4 is a schematic diagram illustrating another exemplary structure of the first prediction model according to some embodiments of the present disclosure.

For more contents about determining the demand quantity for the shared bicycles based on the first prediction model, please refer to FIG. 4 and related descriptions thereof.

Step 220, obtaining historical data of shared bicycles in a plurality of reference areas, and predicting the variation quantity of shared bicycles in the at least one target area at the target time based on the historical data of shared bicycles.

The reference areas may refer to other areas related to the target area. For example, the reference areas may include other areas connected to the target area by a road. As another example, the reference areas may include other areas similar to the target area.

The historical data of shared bicycles may refer to operation-related data of shared bicycles at a first historical time. For example, the historical data of shared bicycles may include number variation data of shared bicycles, road condition data in a reference area at the first historical time, etc. The first historical time may refer to a time period before the target time. For example, if the target time is 9:00-10:00 on Oct. 1, 2025, the first historical time may be a time period before 9:00 on Oct. 1, 2025.

In some embodiments, the historical data of shared bicycles may include at least one of the number of shared bicycles, the people flow, the road environment data, and the shared bicycle transfer data in the plurality of reference areas at the first historical time.

The road environment data may include information such as road accessibility, closure control, and regulation, etc. In some embodiments, when the road is impassable, the flow number of shared bicycles on the road is 0.

The shared bicycle transfer data includes a transfer quantity and a transfer direction. The transfer direction refers to a flow direction from one area to another area. For example, the transfer direction may refer to a flow direction of shared bicycles from an area A to an area B, from the area B to the area A, or the like.

In some embodiments, the historical data of shared bicycles further includes at least one of the number of shared bicycles, the people flow, the road environment data, and the shared bicycle transfer data in the target area at the first historical time.

In some embodiments, the historical data of shared bicycles may be obtained through road surveillance devices. For example, the surveillance video of the target area at the first historical time may be obtained based on the road surveillance devices, and the surveillance video may be processed through an image recognition model to determine the number of shared bicycles, the people flow, and the shared bicycle transfer data. In some embodiments, the shared bicycles in the target area may involve a plurality of operating companies. The number of shared bicycles and the shared bicycle transfer data of different operating companies may be recognized through the image recognition model, and then may be aggregated to obtain the total number of shared bicycles and total shared bicycle transfer data in the target area. In some embodiments, the historical data of shared bicycles may be obtained based on a traffic management platform. For example, road information such as closure control and regulation information may be obtained based on the traffic management platform. In some embodiments, the historical data of shared bicycles may also be obtained based on background data of a plurality of shared bicycle operating companies. For example, vehicle positioning data and trajectory data may be obtained based on the background operation data of a plurality of companies; and the data of the same location and the same trajectory may be integrated as the overall number of shared bicycles and the overall shared bicycle transfer data.

The variation quantity of shared bicycles may refer to the variation quantity of shared bicycles in the target area within the target time. In some embodiments, the riding popularity or the riding demand in the target area may be reflected through the variation quantity of shared bicycles. For example, a large variation quantity of shared bicycles may represent a large demand quantity for riding. In some embodiments, the variation quantity of shared bicycles may include an increase amount and a decrease amount. The increase amount refers to a number of shared bicycles flowing from other areas to the target area, and the decrease amount refers to a number of shared bicycles flowing from the target area to other areas.

In some embodiments, the management platform 130 may determine a historical variation quantity of shared bicycles based on the historical data of shared bicycles, and determine the variation quantity of shared bicycles based on the historical variation quantity of shared bicycles. For example, the historical variation quantity of shared bicycles in a certain time period of several days may be averaged to determine the variation quantity of shared bicycles in the corresponding time period in the future.

In some embodiments, the management platform 130 may construct an operation map based on the at least one target area, the plurality of reference areas, roads connecting the at least one target area and the plurality of reference areas, and historical data of shared bicycles; and determine the variation quantity of shared bicycles in the at least one target area at the target time by processing the operation map based on a second prediction model. The second prediction model may be a machine learning model. For more contents about determining the variation quantity of shared bicycles based on the operation map, please refer to FIGS. 5 and 6 and related descriptions thereof.

Step 230, determining a delivery quantity of shared bicycles in the at least one target area at the target time based on the demand quantity for shared bicycles and the variation quantity of shared bicycles.

The delivery quantity of shared bicycles may refer to a number of shared bicycles that need to be delivered to the target area.

In some embodiments, the management platform 130 may determine the delivery quantity of shared bicycles by taking the difference between the demand quantity for shared bicycles and the variation quantity of shared bicycles. In some embodiments, when the variation quantity of shared bicycles is an increase amount, the variation quantity of shared bicycles is a positive value. It is equivalent to subtracting the increase amount from the demand quantity for shared bicycles to obtain the delivery quantity of shared bicycles. In some embodiments, when the variation quantity of shared bicycles is a decrease amount, the variation quantity of shared bicycles is a negative value. It is equivalent to adding the decrease amount to the demand quantity for shared bicycles to obtain the delivery quantity of shared bicycles. In some embodiments, the management platform 130 may also determine the delivery quantity of shared bicycles through other methods, which is not limited in the present disclosure.

In some embodiments, the method for the shared bicycles delivery and the operation area planning in the smart city further includes obtaining real-time operation reference data of shared bicycles in the at least one target area and adjusting the operation area of shared bicycles at the target time based on the real-time operation reference data.

The real-time operation reference data may refer to real-time data related to the operation of shared bicycles, which may be used to assist in the management of operation area of shared bicycles.

In some embodiments, the real-time operation reference data may include at least one of environmental information, weather information, policy information, time information, social activity information, and user riding information of at least one target area.

The environmental information may include information of roads in the operation area, such as construction information, road damage information (such as landslides), congestion information, or the like. The policy information may include regulation information, closure information (such as epidemic closure), and riding ban information, etc. The time information refers to a time corresponding to the real-time operation reference data. At different time points, the real-time operation reference data is different. The user riding information may refer to historical riding trajectory information, a frequency of riding out of the operation area of the user, etc. For the weather information and the social activity information, please refer to the descriptions in step 210.

In some embodiments, the real-time operation reference data may be obtained in a plurality of ways, for example, the real-time operation reference data may be obtained through third-party platforms including a traffic management platform, a government management platform, a weather forecast platform, etc.

The operation area of shared bicycles refers to an area where the shared bicycles may be ridden and parked.

In some embodiments, the management platform 130 may adjust the operation area based on the real-time operation reference data in a variety of ways. In some embodiments, the management platform 130 may adjust the operation area based on any one of the real-time operation reference data. For example, whether to adjust the operation area and the adjustment range may be determined based on the user riding trajectory in the user riding information, that is, the frequency of riding out of the operation area.

Exemplarily, based on the comparison of the frequency of riding out of the operation area with a preset frequency threshold, the operation area may be adjusted if the frequency is greater than the preset frequency threshold. Further, the adjustment range may be determined based on the area range corresponding to a largest number of riding trajectory. In some embodiments, the management platform 130 may comprehensively adjust the operation area based on various types of the real-time operation reference data. For example, a weighted summation may be performed on the degree of influence of various real-time operation reference data on the adjustment of the operation area, and an operation area adjustment strategy may be determined based on a summation result.

In some embodiments, the management platform 130 may determine an adjustment priority of operation area based on the real-time operation reference data; determine an adjustment strategy of operation area based on the adjustment priority of operation area; and adjust the operation area of shared bicycles at the target time based on the adjustment strategy of operation area. For more contents about adjusting the operation area, please refer to FIG. 7 and related descriptions thereof.

In some embodiments, the real-time operation reference data may further include the predicted people flow and the variation quantity of shared bicycles. In some embodiments, the management platform 130 may obtain the predicted people flow and the variation quantity of shared bicycles in real time; determining a weighted summation result by performing a weighted summation on the predicted people flow and the variation quantity of shared bicycles; determine the adjustment strategy of operation area based on the weighted summation result; and adjust the operation area of shared bicycles at the target time based on the adjustment strategy of operation area. For more contents on adjusting the operation area, please refer to FIG. 8 and related descriptions thereof.

In some embodiments of the present disclosure, the operation area of shared bicycles may be adjusted through various real-time operation reference data. In this way, the operation area may be adjusted based on changes in the external environment, people social behavior, and user riding needs, which can make the adjustment of operation area more accurate, better meet the needs of people, and improve the user experience.

In some embodiments of the present disclosure, the people flow may be predicted through the reference information of people flow, and the demand quantity for shared bicycles may be determined based on the information of people flow; the variation quantity of shared bicycles may be determined through the historical data of shared bicycles; and the delivery quantity may be determined based on the demand quantity and the variation quantity of shared bicycles. This method considers a plurality of factors related to bicycle delivery, making the determined delivery quantity of shared bicycles more accurate. While riding needs of people are satisfied, the difficulty and cost of operation and management can be reduced, and the operation and management of shared bicycles can be efficient and orderly. The operation area is adjusted through a plurality of operation reference data, which can better consider the satisfaction of riding needs of people and the control of the operation costs.

Figure 3:
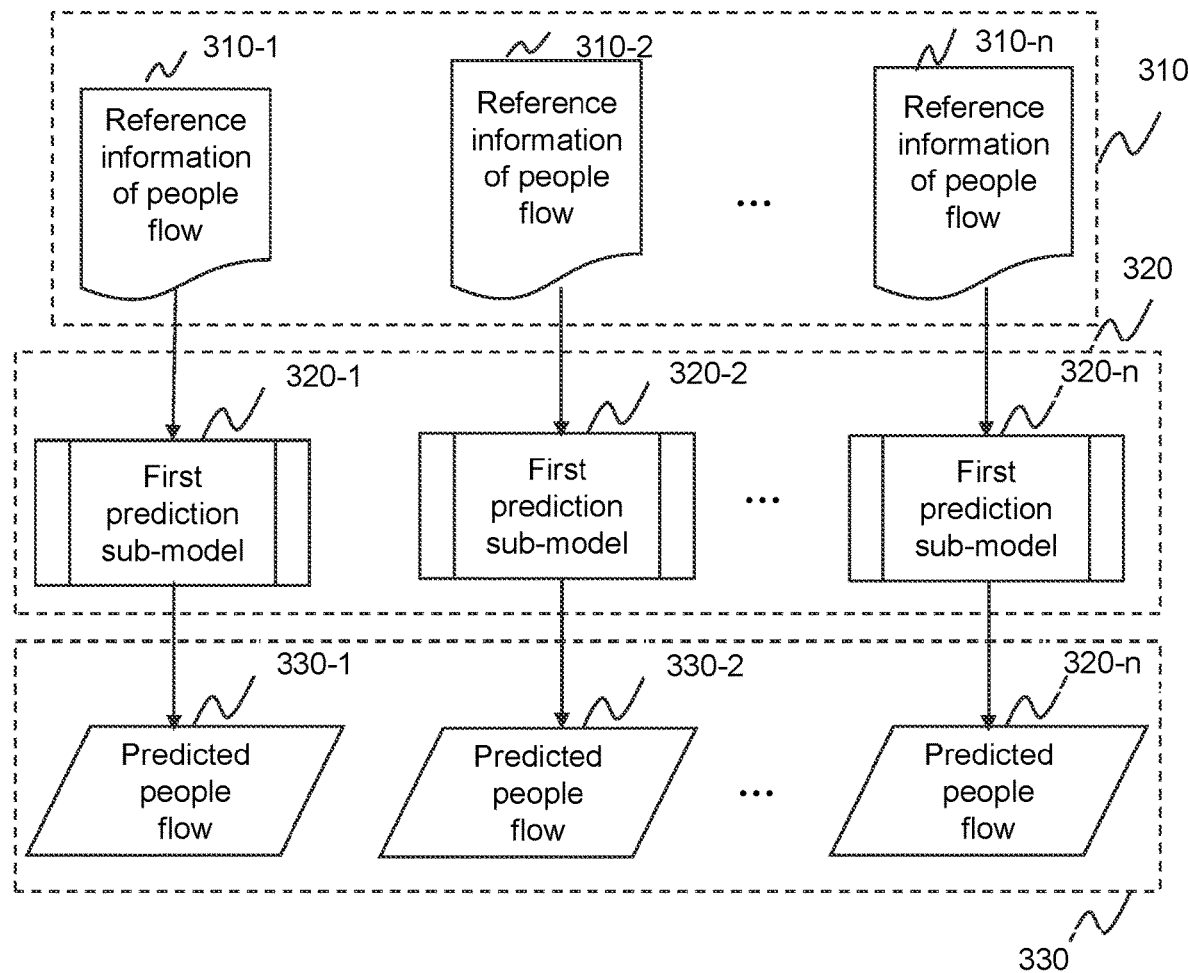
FIG. 3 is a schematic diagram illustrating an exemplary structure of a first prediction model according to some embodiments of the present disclosure.

FIG. 3 is a schematic diagram illustrating an exemplary structure of a first prediction model according to some embodiments of the present disclosure.

In some embodiments, the determining the predicted people flow in the at least one target area at the target time based on the reference information of people flow includes: outputting the predicted people flow in the at least one target area at the target time through the first prediction model based on the reference information of people flow. The first prediction model may be a machine learning model.

In some embodiments, the first prediction model may be at least one of a Convolutional Neural Network (CNN) model, a Deep Neural Network (DNN) model, a Recurrent Neural Network (RNN) model, or other custom models.

As shown in FIG. 3, an input of the first prediction model 320 may be reference information of people flow 310, and an output of the first prediction model 320 may be a predicted people flow 330. For the specific contents of the reference information of people flow, please refer to FIG. 2 and related descriptions thereof.

In some embodiments, the first prediction model may be obtained by training first training samples and first labels. The first training samples may be historical reference information of people flow in a plurality of target areas, and the first labels may be historical actual people flow in each target area. In some embodiments, historical surveillance videos and/or images may be obtained through road surveillance devices, and the first labels may be determined based on the image recognition model.

In some embodiments, the training of the first prediction model may be performed by the management platform 130. In some embodiments, the management platform 130 may input the first training samples into an initial first prediction model, and construct a loss function based on the output of the initial first prediction model and the first labels. Parameters of the initial first prediction model may be updated based on the loss function by a gradient descent method, etc. until a preset condition is met, the trained first prediction model may be obtained. The preset condition may be that the loss function converges or the training reaches a maximum number of times.

In some embodiments, the determining the predicted people flow in the at least one target area at the target time based on the reference information of people flow may include: determining a reference information sequence of people flow based on the reference information of people flow of a plurality of target areas in the at least one target area; outputting a predicted people flow sequence through the first prediction model based on the reference information sequence of people flow. Each element in the predicted people flow sequence may correspond to each target area in the plurality of target areas one-to-one.

In some embodiments, the management platform 130 may determine the reference information sequence of people flow based on the reference information of people flow of the plurality of target areas in the at least one target area.

The reference information sequence of people flow may refer to a queue formed by arranging a plurality of people flow information in a certain manner. For example, the people flow information may be sorted to obtain the reference information sequence of people flow according to a time sequence, a geographic location, etc. In some embodiments, the management platform 130 may number the plurality of target areas, and arrange the reference information of people flow corresponding to the plurality of target areas based on the target area numbers to obtain the reference information sequence of people flow.

The predicted people flow sequence may refer to a queue formed by sorting the predicted people flow based on a certain arrangement rule. For example, the predicted people flow sequence may be formed by sorting the predicted people flows corresponding to the plurality of target areas based on the target area numbers.

In some embodiments, the management platform 130 may output the predicted people flow sequence through the first prediction model based on the reference information sequence of people flow. Each element in the predicted people flow sequence may correspond to each target area in the plurality of target areas one-to-one. Continuing to refer to FIG. 3, the input of the first prediction model 320 may be the reference information sequence of people flow 310, and the output of the first prediction model 320 may be the predicted people flow sequence 330.

In some embodiments, when the first prediction model is used to process the reference information sequence of people flow, the first training samples may be sample people flow reference information sequences composed of historical people flow reference information of the plurality of target areas according to the area numbers; and the first labels may be sequences composed of historical actual people flows of the plurality of target areas. For the specific training method, please refer to the relevant description of training the first prediction model for processing the reference information of people flow, which will not be repeated here.

In some embodiments of the present disclosure, by combining the reference information of people flow of the plurality of target areas as the people flow reference information sequence to input to the model, the predicted people flows of the plurality of target areas can be obtained at the same time, and the prediction efficiency can be improved.

In some embodiments, the first prediction model may include a plurality of first prediction sub-models, and each of the plurality of first prediction sub-models corresponds to the target area in a one-to-one manner. Each first prediction sub-model may be used to process the reference information of people flow corresponding to the target area to determine the predicted people flow corresponding to the target area. As shown in FIG. 3, the first prediction model 320 may include a first prediction sub-model 320-1, a first prediction sub-model 320-2, . . . , a first prediction sub-model 320-n.

Continuing to refer to FIG. 3, the input of the first prediction sub-model 320-1 may be the reference information of people flow 310-1 of a first target area corresponding to the first prediction sub-model 320-1, and the output of the first prediction sub-model 320-1 may be the predicted people flow 330-1 of the first target area. The input of the first prediction sub-model 320-2 may be reference information of people flow 310-2 of a second target area corresponding to the first prediction sub-model 320-2, and the output of the first prediction sub-model 320-2 may be a predicted people flow 330-2 of the second target area. The input of the first prediction sub-model 320-n may be reference information of people flow 310-n of a Nth target area corresponding to the first prediction sub-model 320-n, and the output of the first prediction sub-model 320-n may be a predicted people flow 330-n of the Nth target area.

In some embodiments, the first prediction sub-models may be trained in a manner of training the first prediction model. In some embodiments, the first training samples for training the first prediction sub-models may include the reference information of people flow in the target area corresponding to each first prediction sub-model at a plurality of second historical times, and the first labels may include an actual people flow at each second historical time.

In some embodiments, the first prediction model may include an embedding layer and a prediction layer. The embedding layer is used to embed the reference information of people flow to obtain a feature vector of people flow; and the prediction layer is used to process the feature vector of people flow to determine the predicted people flow.

In some embodiments, the embedding layer and the prediction layer of the first prediction model may be obtained through joint training. In some embodiments, the management platform 130 may train the embedding layer and the prediction layer based on the first training samples and the first labels. In some embodiments, the management platform 130 may input the first training samples into an initial embedding layer to obtain an initial feature vector of people flow, input the initial feature vector of people flow into the prediction layer to obtain an initial predicted people flow, and construct a loss function based on the initial predicted people flow and the first labels, and update parameters of the embedding layer and the prediction layer at the same time. Through parameter updating, a trained embedding layer and prediction layer may be obtained. For descriptions of the first training samples and the first labels, please refer to the above-related descriptions.

By training the corresponding first prediction sub-models based on the historical reference information of people flow of each of the plurality of target areas, the first prediction sub-model corresponding to each target area can learn differentiated features of the corresponding area, and the performance of the first prediction sub-model can be improved. Then, the people flow may be predicted based on the trained first prediction sub-models, which can improve the prediction accuracy.

In some embodiments of the present disclosure, the first prediction model is used to predict the people flow of the target area, and the self-learning ability of the machine learning model may be used to predict the people flow by finding patterns in a large amount of data, which can improve the prediction efficiency and prediction accuracy. Both the demand quantity for shared bicycles and the variation quantity of shared bicycles are closely related to the people flow. By predicting the people flow, a reliable data support can be provided for the subsequent prediction of the demand quantity for shared bicycles and the variation quantity of shared bicycles.

In some embodiments, the first prediction model may include a people flow prediction layer and a demand quantity layer. The people flow prediction layer may process the reference information of people flow to determine the predicted people flow. The demand quantity prediction layer may process the predicted flow of people to determine the demand quantity for shared bicycles in the at least one target area.

In some embodiments, as shown in FIG. 4, the first prediction model may include a people flow prediction layer 420 and a demand quantity prediction layer 440.

In some embodiments, the people flow prediction layer 420 may be configured to process the reference information of people flow 410 to determine the predicted people flow 430. In some embodiments, the demand quantity prediction layer 440 may be configured to process the predicted people flow 430 to determine the demand quantity for the shared bicycles 450 in the at least one target area. For the specific contents about the reference information of people flow, please refer to FIG. 2 and related descriptions thereof.

In some embodiments, the people flow prediction layer 420 and the demand quantity prediction layer 440 may be obtained through separately training. In some embodiments, the people flow prediction layer 420 may share the parameters of the first prediction model/first prediction sub-model described in FIG. 3, and its training may be performed by a method for training the first prediction model/first prediction sub-model described in FIG. 3. In some embodiments, third training samples for training the demand quantity prediction layer 440 may be people flows in the plurality of target areas at the second historical time. Third labels may be the actual demand quantities for shared bicycles in the plurality of target areas at the second historical time. The third labels may be determined based on the operation data of major shared bicycle operating companies.

In some embodiments, the management platform 130 may input the third training samples into an initial demand quantity prediction layer, and construct a loss function based on the output of the initial demand quantity prediction layer and the third labels; update the parameters of the initial demand quantity prediction layer based on the loss function by a gradient descent method, etc.; and obtain the trained demand quantity prediction layer until the loss function converges or the training reaches the maximum times.

In some embodiments, the people flow prediction layer and the demand quantity prediction layer may be obtained through joint training. In some embodiments, fourth training samples for jointly training the people flow prediction layer and the demand quantity prediction layer may be the reference information of people flow in at least one target area at the second historical time; and fourth labels may be the actual demand quantity for the shared bicycles in the at least one target area at the second historical time. In some embodiments, the fourth training samples may be inputted into an initial people flow prediction layer to obtain an initial predicted people flow in the at least one target area at the second historical time; the initial predicted people flow in the at least one target area at the second historical time may be inputted into the initial demand quantity prediction layer to obtain an initial demand quantity for shared bicycles in the at least one target area at the second historical time. A loss function may be constructed based on the initial demand quantity for shared bicycles and the fourth labels, and the parameters of the initial people flow prediction layer and the initial demand quantity prediction layer may be updated synchronously. Through parameter updating, the trained people flow prediction layer and the trained demand quantity prediction layer may be obtained.

In some embodiments of the present disclosure, the people flow prediction layer and the demand quantity prediction layer may be set in the first prediction model. The first prediction model may determine the demand quantity for shared bicycles based on the reference information of people flow to improve data processing efficiency and prediction speed.

Figure 5:
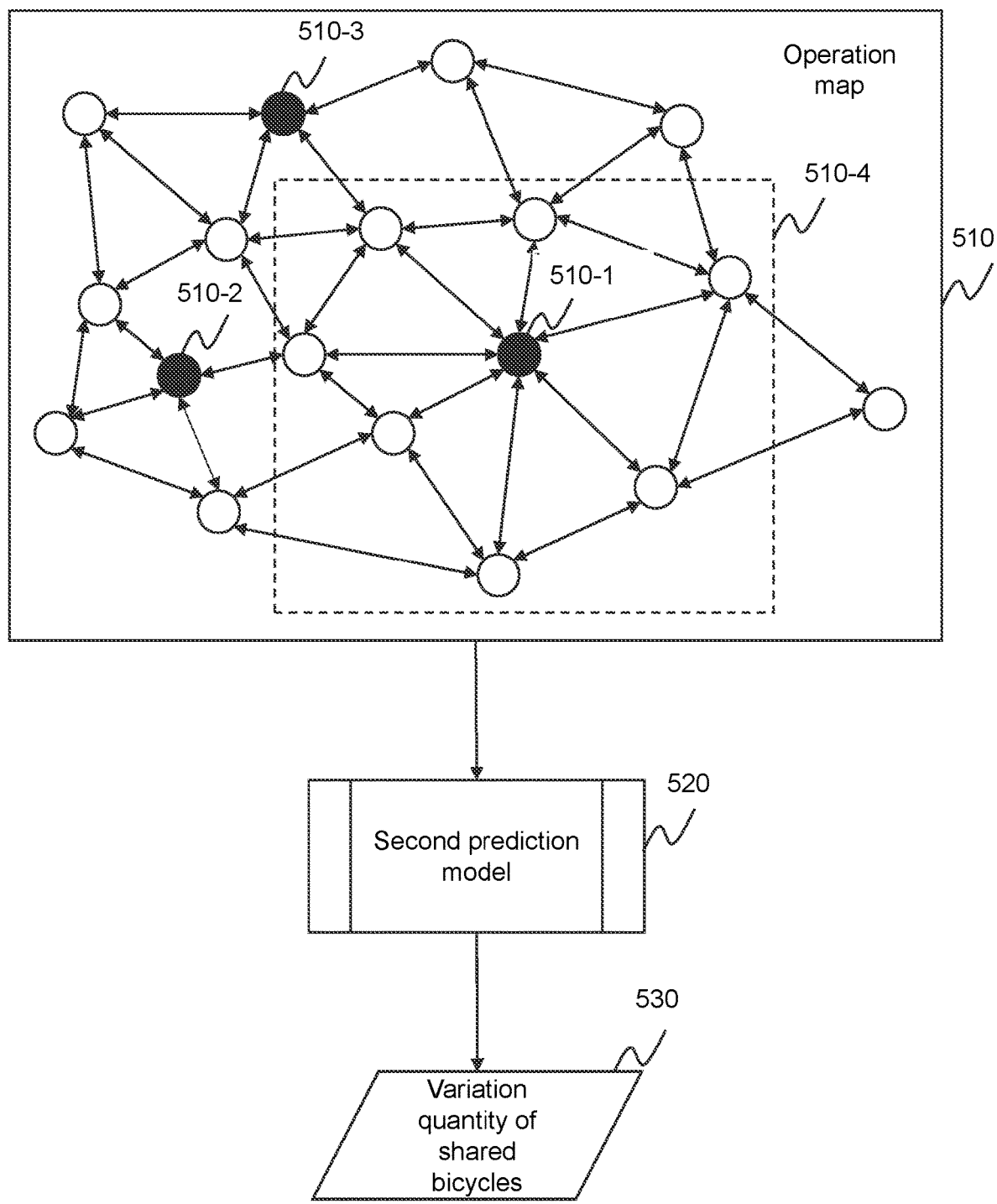
FIG. 5 is a schematic diagram illustrating a process for determining a variation quantity of shared bicycles based on an operation map according to some embodiments of the present disclosure.

FIG. 5 is a schematic diagram illustrating a process for determining a variation quantity of shared bicycles based on an operation map according to some embodiments of the present disclosure.

In some embodiments, the predicting the variation quantity of shared bicycles in the at least one target area at the target time based on the historical data of shared bicycles may include: constructing an operation map based on the at least one target area, the plurality of reference areas, the roads connecting the at least one target area and the plurality of reference areas, the roads interconnecting the plurality of reference areas, and the historical data of shared bicycles; and determining the variation quantity of shared bicycles in the at least one target area at the target time by processing the operation map based on the second prediction model. The second prediction model may be a machine learning model.

In some embodiments, the management platform 130 may determine the variation quantity of shared bicycles by constructing the operation map and processing the operation map based on the second prediction model.

In some embodiments, the management platform 130 may construct the operation map based on the at least one target area, the plurality of reference areas, the roads connecting the at least one target area and the plurality of reference areas, the roads interconnecting the plurality of reference areas, and the historical data of shared bicycles. For the specific contents about the historical data of shared bicycles, please refer to FIG. 2 and related descriptions thereof.

The operational map may refer to a graph used to store and reflect operation data and relevant data of shared bicycles. In some embodiments, a relationship between features of the operation data and the relevant data of shared bicycles and the operation data and the relevant data of shared bicycles may be represented in the form of a graph to form the operation map.

In some embodiments, the operation map may use the at least one target area and the plurality of reference areas as nodes and the roads as edges, edges being directed edges, and the directions of the edges corresponding to the flow direction of shared bicycles. The node features may include the number of shared bicycles and the people flow at the first historical time. The edge features may include the shared bicycle transfer data and the road environment data at the first historical time.

In some embodiments, as shown in FIG. 5, the nodes of the operation map 510 are at least one target area node and a plurality of reference area nodes. The target area nodes may be represented by black nodes 510-1, 510-2 and 510-3, and the reference area nodes may be represented by a plurality of white nodes. The features of the target area nodes and the reference area nodes include the number of shared bicycles and the people flow at the first historical time. For the contents of how to obtain the number of shared bicycles and the people flow at the first historical time, please refer to FIG. 2 and related description thereof.

In some embodiments, the operation map uses the roads connecting the target areas and the plurality of reference areas, and the roads interconnecting the plurality of reference areas as edges. As shown in FIG. 5, in the operation map 510, the target areas 510-1, 510-2, and 510-3 are connected to the plurality of corresponding reference areas by edges, and the plurality of reference areas are connected to each other by edges. The edges are directed edges, and the directions of the edges represent the direction in which the shared bicycles flow (transfer) between the target areas and the reference areas. For example, the edges connecting the target area 510-1 and the plurality of corresponding reference areas may represent the flow directions of shared bicycles between the target area 510-1 and the plurality of corresponding reference areas.

In some embodiments, the edge features include the shared bicycle transfer data and the road environment data at the first historical time. For example, the edge features of the edge connecting the target area 510-1 and the plurality of corresponding reference areas are the numbers of shared bicycles flowing (transferring) between the target area 510-1 and the plurality of corresponding reference areas at the first historical time, the transfer directions, and the road environment data of the roads connecting the target area 510-1 and the plurality of corresponding reference areas.

In some embodiments, the second prediction model 520 may be at least one of a Graph Neural Network (GNN) model, a Graph Convolution Networks (GCN) model, a Graph Attention Networks (GAN) model, or other custom models.

In some embodiments, as shown in FIG. 5, the input of the second prediction model 520 may be the operation map 510, and the output of the second prediction model 520 may be the variation quantity of shared bicycles 530 of at least one target area node at the target time. For example, assuming that the target time is 9:00-10:00 on Oct. 1, 2025, the historical data of shared bicycles at the first historical time of 8:00-9:00 on Oct. 1, 2025 may be obtained to construct an operation map. The variation quantity of shared bicycles in the target area at the target time of 9:00-10:00 on Oct. 1, 2025 may be obtained by inputting the constructed operation map into the second prediction model 520.

In some embodiments, the management platform 130 may extract the operation sub-graph corresponding to each target area from the operation map in a manner of an adjacency of 1 based on each target area node. The adjacency of 1 means that the nodes are directly connected to the target area without passing through intermediate nodes. For example, as shown in FIG. 5, the management platform 130 may extract the operation sub-graph corresponding to the target area 510-1 based on the target area 510-1 by taking the adjacency as 1. The operation sub-graph corresponding to the target area 510-1 is shown as an area in a dashed box 510-4, including the target area 510-1, reference areas adjacent to the target area 510-1, and edges interconnecting the target area 510-1 and the plurality of corresponding reference areas.

In some embodiments, the management platform 130 may process the operation sub-graph corresponding to each target area based on the second prediction model 520, and determine the variation quantity of shared bicycles corresponding to each target area. For example, the management platform 130 may input the operation sub-graph corresponding to the target area 510-1 into the second prediction model 520 to obtain the variation quantity of shared bicycles of the target area 510-1 at the target time.

In some embodiments, the second prediction model 520 may be obtained through training. In some embodiments, the second training samples for training the second prediction model 520 may be a plurality of sample operation maps constructed based on the historical data of shared bicycles at a plurality of first historical times. Exemplarily, if the target time is 13:00-14:00 on Oct. 1, 2025, the plurality of first historical times may be 6:00-7:00, 7:00-8:00, . . . , 11:00-12:00, 12:00-13:00 on Oct. 1, 2025, etc. The second labels may include the actual variation quantity of shared bicycles corresponding to each sample operation map, i.e., the actual variation quantity of shared bicycles at a next historical time of each first historical time. The second labels may be determined by processing the historical road surveillance video through an image recognition model. For example, the operation map may be constructed based on the historical data of shared bicycles at the first historical time of 6:00-7:00 on Oct. 1, 2025, the second labels may be actual variation quantity of shared bicycles at the next historical time of 7:00-8:00 on Oct. 1, 2025.

In some embodiments, the management platform 130 may input the second training samples into an initial second prediction model to obtain an initial variation quantity of shared bicycles. A loss function may be constructed based on the initial variation quantity of the shared bicycle and the second labels, and the parameters of the initial second prediction model may be updated through the loss function. Through parameter updating, the trained second prediction model may be obtained.

In some embodiments of the present disclosure, by constructing the operation map, the operation data, the relevant data, and the relationship and features between the data can be more intuitively represented. Meanwhile, by processing the operation map through the second prediction model, the accuracy and efficiency of predicting the variation quantity of shared bicycles can be improved by using the processing capability of the second prediction model on the map structure.

Figure 6:
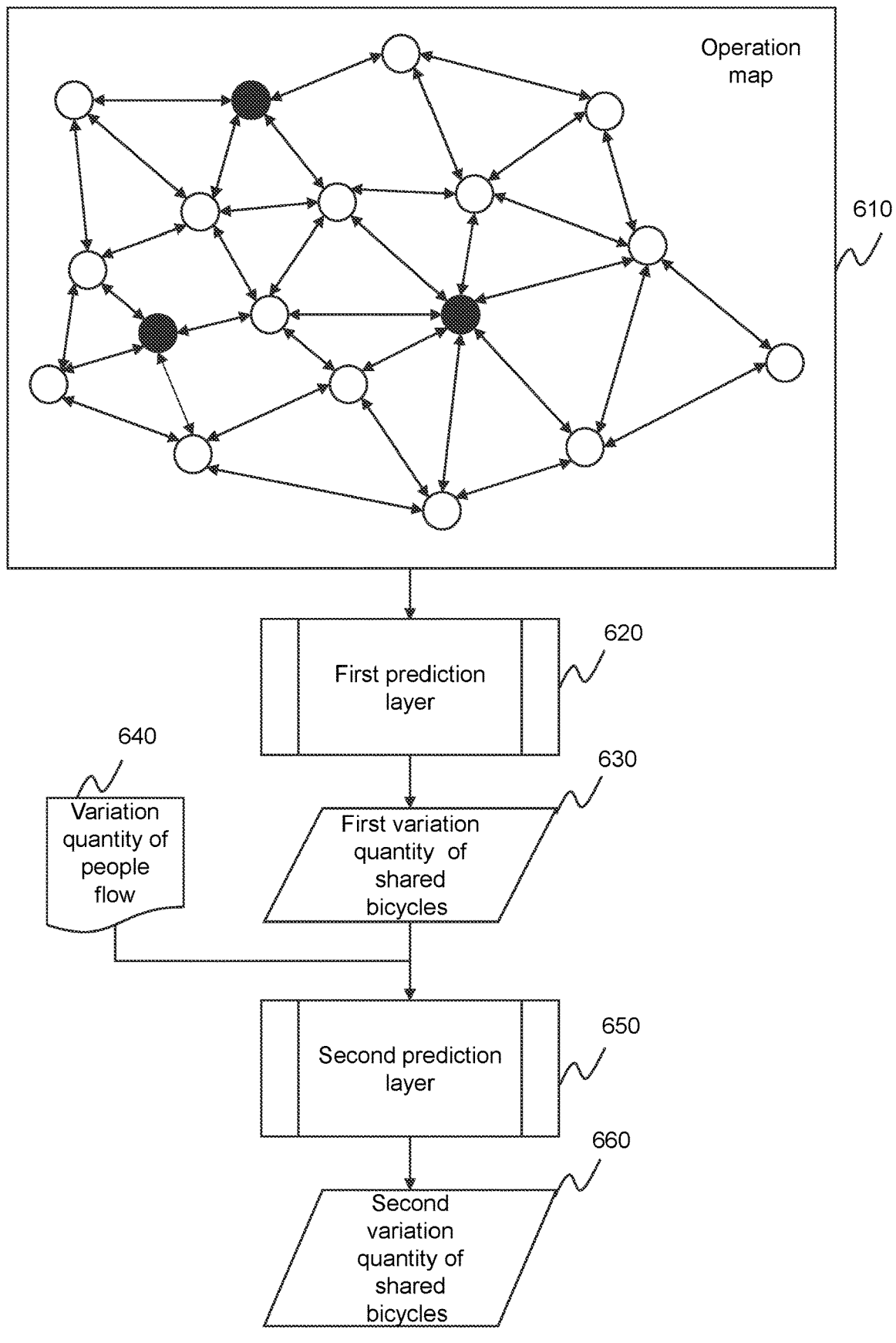
FIG. 6 is a schematic diagram illustrating another process for determining a variation quantity of shared bicycles based on an operation map according to some embodiments of the present disclosure.

FIG. 6 is a schematic diagram illustrating another process for determining a variation quantity of shared bicycles based on an operation map according to some embodiments of the present disclosure.

In some embodiments, the variation quantity of shared bicycles may be related to the variation quantity of people flow, and the variation quantity of people flow may be determined based on the historical people flow and the predicted people flow.

The variation quantity of people flow refers to a variation number of people flow. For example, the variation quantity of people flow may be the difference in people flows at two different time points. Exemplarily, it is assumed that the people flow of the target area is 10,000 people at 9:00 a.m. on Oct. 1, 2025, and the people flow at 10:00 a.m. is 12,000 people. Then the variation quantity of people flow of the target area from 9:00 a.m. to 10:00 a.m. on Oct. 1, 2025 is 2,000 people. The variation quantity of people flow may be divided into an increase amount of people flow and a decrease amount of people flow.

In some embodiments, the variation quantity of people flow may be determined based on historical people flow and the predicted people flow. The historical people flow may be a people flow at the time node before the target time. For example, the target time is 10:00 a.m. on Oct. 1, 2025, and the historical people flow may be the people flow at 9:00 a.m., 9:30 a.m., 9:50 a.m., . . . , etc. on Oct. 1, 2025. In some embodiments, the management platform 130 may make a difference between the historical people flow and the predicted people flow, and use the difference as the variation quantity of people flow. For example, the historical people flow corresponding to the target time is 1,000 people, and the predicted people flow at the target time is 1,200 people. Then, the management platform 130 may subtract 1,000 people from 1,200 people to obtain the variation quantity of people flow as 200 people, that is, the increase amount of people flow is 200 people.

Both the increase and the decrease of people flow may affect the riding rate of shared bicycles, thereby affecting the variation quantity of shared bicycles. For example, if the people flow increases, the riding rate of shared bicycles may increase accordingly, and the variation quantity of shared bicycles may also increase accordingly. Therefore, by predicting the variation quantity of people flow, a more powerful data support for the subsequent prediction of the variation quantity of shared bicycles can be provided.

In some embodiments, the second prediction model may include a first prediction layer and a second prediction layer. The first prediction layer is used to process the operation map to determine a first variation quantity of shared bicycles in the at least one target area at the target time. The second prediction layer is used to process the first variation quantity of shared bicycles and the variation quantity of people flow to determine a second variation quantity of shared bicycles in the at least one target area at the target time.

The first variation quantity of shared bicycles refers to a variation quantity of shared bicycles in the at least one target area predicted based on the operation map. The second variation quantity of shared bicycles may be a variation quantity of shared bicycles (i.e., a final variation quantity of shared bicycles) predicted based on the first variation quantity of shared bicycles in combination with the variation quantity of people flow. The second variation quantity of shared bicycles may be more accurate than the first variation quantity of shared bicycles.

As shown in FIG. 6, the second prediction model may include a first prediction layer 620 and a second prediction layer 650. In some embodiments, the first prediction layer may be a Graph Neural Network (GNN) model, and the second prediction model may be a Deep Neural Networks (DNN) model. The input of the first prediction layer 620 may be the operation map 610, and the output of the first prediction layer 620 may be the first variation quantity of shared bicycles 630 in the at least one target area at the target time. The input of the second prediction layer 650 may be the first variation quantity of shared bicycles 630 and the variation quantity of people flow 640, and the output of the second prediction layer 650 may be the second variation quantity of shared bicycles 660 in the at least one target area at the target time.

In some embodiments, the second variation quantity of shared bicycles is the final variation quantity of shared bicycles.

In some embodiments, the first prediction layer and the second prediction layer of the second prediction model may be obtained through separately training. In some embodiments, the parameters of the first prediction layer of the second prediction model and the second prediction model described in FIG. 5 are shared, and the training of the second prediction model may be realized by the method of training the second prediction model described in FIG. 3, which will not be repeated here.

In some embodiments, fifth training samples for training the second prediction layer of the second prediction model may be first sample variation quantity of shared bicycles and sample variation quantity of people flow. The first sample variation quantity of shared bicycles may be obtained based on the trained first prediction layer. The sample variation quantity of people flow may be determined based on the people flow of a plurality of first historical time nodes in the target area and the corresponding people flow of a plurality of next historical time nodes. The first sample variation quantity of shared bicycles corresponds to the sample variation quantity of people flow in time, i.e., the first sample variation quantity of shared bicycles and the sample variation quantity of people flow are obtained based on the same time. Exemplarily, the people flow of the target area at the plurality of first historical time nodes may be obtained. For example, if the target time is 15:00 on Oct. 1, 2025, the people flow at 8:00, 9:00, 10:00, 11:00, 12:00, 13:00, 14:00, 15:00 on Oct. 1, 2025 may be obtained; and a plurality of sample variation quantities of people flow may be determined respectively based on the people flow at 8:00 and 9:00, the people flow at 9:00 and 10:00, the people flow at 10:00 and 11:00, . . . , the people flow at 14:00 and 15:00 on Oct. 1, 2025. For the specific contents about obtaining the people flow, please refer to FIG. 2 and related descriptions thereof.

In some embodiments, the fifth labels for training the second prediction layer may be the actual variation quantity of shared bicycles corresponding to the fifth training samples. The fifth labels may be determined by processing the road surveillance video of the first historical time corresponding to the fifth training samples based on the image recognition model.

In some embodiments, the management platform 130 may input the fifth training samples (the first sample variation quantity of shared bicycles and the sample variation quantity of people flow) into the initial second prediction layer to obtain a second initial variation quantity of shared bicycles. A loss function may be constructed based on the second initial variation quantity of shared bicycles and the fifth labels to update the parameters of the initial second prediction layer. The trained second prediction layer may be obtained based on parameter updating.

In some embodiments, the first prediction layer and the second prediction layer of the second prediction model may be obtained through jointly training.

In some embodiments, sixth training data of the jointly training includes a plurality of sample operation maps constructed based on the historical data of shared bicycles of the plurality of first historical time nodes and the sample variation quantity of people flow. Sixth labels may include the actual variation quantity of shared bicycles in the target area at each first historical time node.

In some embodiments, the management platform 130 may input the sample operation map into the initial first prediction layer to obtain the first variation quantity of shared bicycles outputted by the first prediction layer; and use the first variation quantity of shared bicycles as a sample to input into the initial second prediction layer with the sample variation quantity of people low to obtain the second variation quantity of shared bicycles outputted by the second prediction layer. A loss function may be constructed based on the sixth labels and the second variation quantity of shared bicycles outputted by the second prediction layer, and the first prediction layer and the second prediction layer may be updated synchronously. The trained first prediction layer and the trained second prediction layer may be obtained through parameter updating.

By jointly training the first prediction layer and the second prediction layer, the model can learn deeper data features, the model obtained by training can have better performance, and the prediction accuracy can be improved.

In some embodiments of the present disclosure, by determining the variation quantity of people flow, a strong data support can be provided for the subsequent prediction of the variation quantity of shared bicycles. The variation quantity of shared bicycles is affected by the variation quantity of people flow. When predicting the variation quantity of shared bicycles, the variation quantity of people flow may be added as an input, which can improve the accuracy of the prediction and make the prediction results more realistic.

In some embodiments, the management platform 130 may determine the delivery quantity of shared bicycles based on the demand quantity for shared bicycles and the variation quantity of shared bicycles in the at least one target area. For the specific contents about determining the delivery quantity of shared bicycles, please refer to FIG. 2 and related descriptions thereof.

In some embodiments, the delivery quantity of shared bicycles determined by the management platform 130 may be the total delivery quantity of shared bicycles of multiple operation companies. In some embodiments, the management platform 130 may determine the delivery quantity of shared bicycles of each operation company in the corresponding target area based on the delivery ratio of shared bicycles of each operation company, and send the delivery quantity of shared bicycles to each operation company through the user platform. For example, operation companies A, B, and C deliver 30%, 30%, and 40% of shared bicycles in target area 1, respectively, and the delivery quantity of shared bicycles in target area 1 at the target time may be determined as 1,000. Then the delivery quantity of shared bicycles in target area 1 of operation companies A, B, and C may be determined as 300, 300, and 400, respectively based on the delivery ratio.

In some embodiments, the management platform 130 may determine the delivery ratio based on the proportion of the historical variation quantity of shared bicycles of each company to the total historical variation quantity of shared bicycles in the corresponding area. The historical variation quantity of shared bicycles includes a sum of input and output, which may be obtained by summary analysis based on the operation data of each company. For example, if the total historical variation quantity of shared bicycles in the target area 1 is 300, and the historical variation quantity of shared bicycles of operation companies A, B, and C are 60, 90, and 150, respectively, then the delivery ratio of the operation companies A, B, and C may be determined as 20%, 30%, and 50%, respectively.

Figure 7:
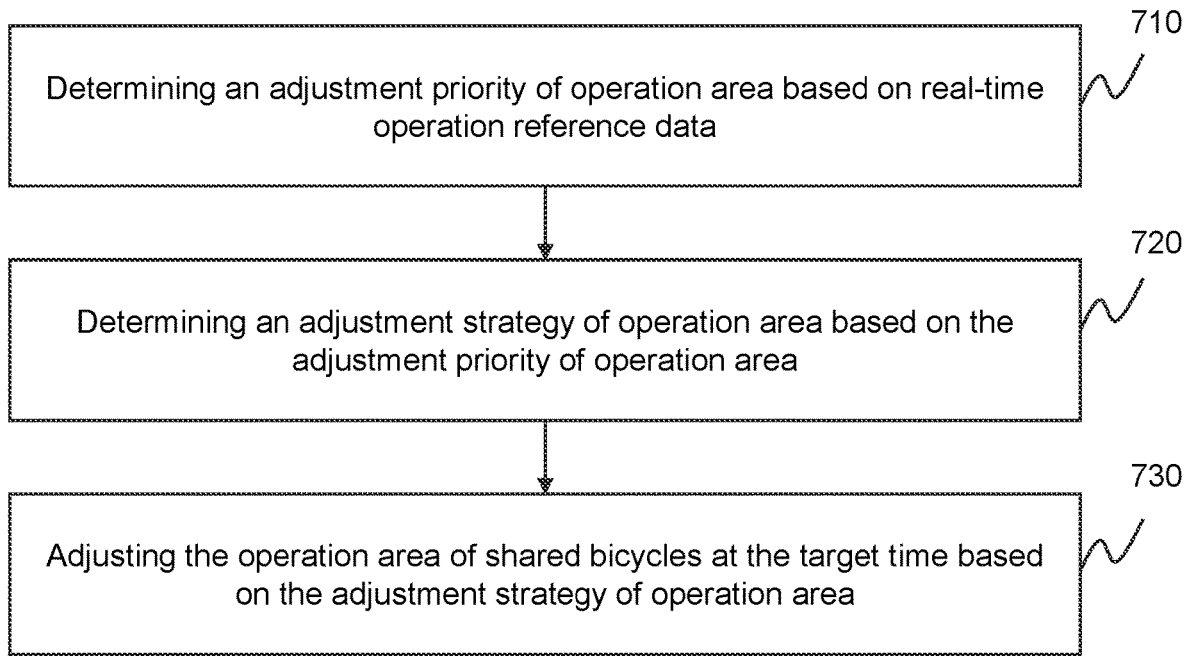
FIG. 7 is a flowchart illustrating a process for adjusting an operation area according to some embodiments of the present disclosure.

FIG. 7 is a flowchart illustrating a process for adjusting an operation area according to some embodiments of the present disclosure. In some embodiments, a process 700 may be performed by the user platform 110 and the management platform 130. As shown in FIG. 7, the process 700 includes the following steps.

Step 710: determining an adjustment priority of operation area based on real-time operation reference data.

The adjustment priority of operation area may refer to a degree of importance and priority of the real-time operation reference data when adjusting the operation area. For example, the adjustment priority of operation area may be determined based on the degree of importance of each type of real-time operation reference data. The management platform 130 may prioritize a type of real-time operation reference data with a high degree of importance as a reference and adjust the operation area based on the reference.

In some embodiments, the adjustment priority of operation area may be determined based on the degree of importance of the real-time operation reference data. For example, each of the real-time operation reference data may be ranked based on the degree of importance, and a reference order when adjusting the operation area may be determined based on the ranking. Exemplarily, the real-time operation reference data may include environmental information, weather information, policy information, time information, social activity information, and user riding information of the target area. The real-time operation reference data may be ranked to determine the priority based on the degree of importance. For example, the priority is determined as policy information>environmental information>weather information>social activity information>user riding information based on the order of the degree of importance. In some embodiments, the degree of importance of each of the real-time operation reference data may be set based on actual operation needs, or may be set by default through the management platform 130. When setting the degree of importance, the impact of different real-time reference data on riding safety, riding accessibility, and the operation cost of shared bicycles may be considered.

Step 720: determining an adjustment strategy of operation area based on the adjustment priority of operation area.

The adjustment strategy of operation area refers to a specific adjustment plan of operation area. For example, the adjustment strategy of operation area may include whether to adjust, an adjustment method, an adjustment range, etc. The adjustment method may include reducing the operation area, expanding the operation area, closing the operation area, etc.

In some embodiments, the adjustment strategy of operation area may be sequentially determined based on the adjustment priority of operation area according to a priority order. For example, it may firstly determine whether to adjust the operation area, the adjustment method, and the adjustment range based on the policy information of a first priority. If the determination result is adjustment, the operation area may be adjusted directly according to the policy information. For example, the closure control area may be adjusted to a non-operation area based on the closure control information in the policy information. If the determination result is no adjustment, it is continued to determine whether to adjust, the adjustment method, and the adjustment range based on the environmental information of the second priority. A final adjustment strategy of operation area may be determined by performing the steps in sequence according to the foregoing method. In some embodiments, the adjustment strategy of the operating area may be related to the real-time reference data that determines the adjustment of operation area. For example, if the adjustment of operation area is determined based on the policy information of the first priority, the corresponding adjustment strategy may be determined based on the specific policy information. If the adjustment of operation area is determined based on the environmental information of the second priority, the corresponding adjustment strategy may be determined based on the specific environmental information.

Step 730: adjusting the operation area of shared bicycles at the target time based on the adjustment strategy of operation area.

In some embodiments, the management platform 130 may upload the adjustment strategy of operation area to the user platform 110 through the service platform 120. In some embodiments, the user platform 110 may adjust the operation area of shared bicycles at the target time based on the specific adjustment method and adjustment range in the adjustment strategy of operation area. For example, if the adjustment strategy of operation area is adjustment, the adjustment method is expansion, and the adjustment range is 1 km, the user platform 110 may make specific adjustment on the operation area based on the foregoing information.

In some embodiments of the present disclosure, the adjustment priority of operation area may be determined based on the real-time operation reference data, and the adjustment strategy of operation area may be determined based on the adjustment priority, so as to adjust the operation area. When determining the adjustment priority of operation area and the adjustment strategy of operation area, the influence and the influence degree of the various real-time reference data of operation area on riding and operation and management can be considered, so that the adjustment of operation area can be more accurate and meet the actual riding needs and the operation and management needs of shared bicycles.

It should be noted that the above description about the process 700 is only for example and illustration, and does not limit the scope of application of this disclosure. For technicians skilled in the art, various modifications and changes can be made to the process 700 under the guidance of this disclosure. However, these corrections and changes are still within the scope of this disclosure. For example, process 700 may include determining the degree of importance of the real-time operation reference data.

Figure 8:
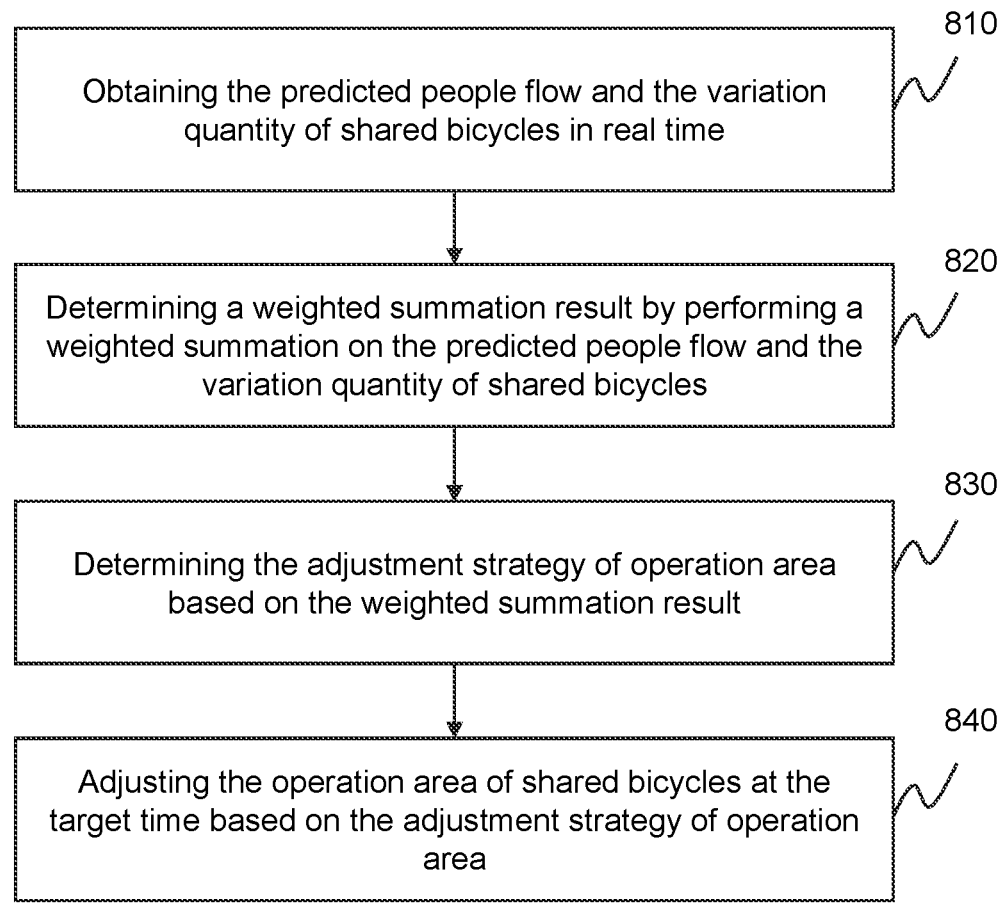
FIG. 8 is a flowchart illustrating another process for adjusting an operation area according to some embodiments of the present disclosure.

FIG. 8 is a flowchart illustrating another process for adjusting an operation area according to some embodiments of the present disclosure. In some embodiments, a process 800 may be performed by the user platform 110 and the management platform 130. As shown in FIG. 8, the process 800 includes the following steps.

Step 810, obtaining the predicted people flow and the variation quantity of shared bicycles in real time.

In some embodiments, the management platform 130 may obtain the predicted people flow and the variation quantity of shared bicycles stored in the general management platform database in real time. In some embodiments, the management platform 130 may determine the predicted people flow and the variation quantity of shared bicycles and directly perform a weighted summation based on the determined predicted people flow and the determined variation quantity of shared bicycles.

Step 820: determining a weighted summation result by performing a weighted summation on the predicted people flow and the variation quantity of shared bicycles.

In some embodiments, the management platform 130 may perform the weighted summation on the predicted people flow and the variation quantity of shared bicycles based on preset weights to determine the weighted summation result. In some embodiments, the preset weights may be determined based on the actual operation needs, or set by default through the system, and the sum of weights is 1.

Step 830: determining the adjustment strategy of operation area based on the weighted summation result.

In some embodiments, the management platform 130 may determine the adjustment strategy of operation area by comparing the weighted summation result with a preset adjustment threshold. The preset adjustment threshold may be set by default through the system or set based on the actual operation needs. For example, when the weighted summation result is less than the preset adjustment threshold, the operation area may not be adjusted. If the weighted summation result is greater than the preset adjustment threshold, the operation area may be expanded. In some embodiments, the adjustment strategy of operation area further includes the adjustment range. In some embodiments, the adjustment range of operation area may be determined based on the weighted summation result. For example, a numerical interval may be divided in advance, and each interval corresponds to an adjustment range. The numerical interval may be determined based on the weighted summation result, and the adjustment range corresponding to the interval is the required adjustment range of shared bicycles. Exemplarily, before the weighting, the predicted people flow and the variation quantity of shared bicycles are both an integer, and after the weighting, the weighted summation result is also a numerical value. The possible interval in which the numerical values are located may be divided to form a plurality of numerical value intervals.

Step 840, adjusting the operation area of shared bicycles at the target time based on the adjustment strategy of operation area.

In some embodiments, the management platform 130 may adjust the operation area of shared bicycles at the target time based on the specific information in the adjustment strategy of operation area. For example, the operation area may be adjusted based on the specific adjustment method and adjustment range in the adjustment strategy of operation area.

In some embodiments of the present disclosure, the adjustment strategy of operation area may be determined based on the predicted people flow and the variation quantity of shared bicycles, which can consider the influence of the people flow and the variation quantity of bicycles on the riding needs and the riding range, so as to be more in line with the actual adjustment needs of operation area.

It should be noted that the above description about the process 800 is only for example and illustration, and does not limit the scope of application of the present disclosure. For technicians skilled in the art, various modifications and changes can be made to the process 800 under the guidance of this disclosure. However, these corrections and changes are still within the scope of this disclosure. For example, the process 800 may include determining weights for the weighted summation.

One of the embodiments of the present disclosure further provides a non-transitory computer-readable storage medium storing computer instructions. After a computer reads the computer instructions in the storage medium, the computer performs the method for the shared bicycles delivery and the operation area planning in the smart city described in the embodiments of the present disclosure.

The possible beneficial effects of the embodiments of the present disclosure include, but are not limited to: (1) predicting the demand quantity for shared bicycles and the variation quantity of shared bicycles based on the reference information of people flow and the historical data of shared bicycles in each target area; then determining the delivery quantity of shared bicycles based on the demand quantity for shared bicycles and the variation quantity of shared bicycles, which fully considers the impact of various factors on the demand quantity for shared bicycles, and improves the accuracy of determining the delivery quantity of shared bicycles. At the same time, the adjustment strategy of operation area may be determined based on the real-time operation reference data of shared bicycles, the real-time people flow, and the variation quantity of shared bicycles, thereby dynamically adjusting the operation area to meet the actual operation needs. (2) processing a large amount of data involved by training the machine learning model to improve the efficiency and accuracy of data processing, performing data obtaining and data processing based on the Internet of Things platforms, which can realize the automation and intelligence of operation and management of shared bicycles, and improve the efficiency and effect of operation and management. (3) processing the historical data of shared bicycles in the plurality of areas by constructing the operation map, which can make the correlation between data and the flow of data more intuitive and clearer, and then the processing efficiency and processing effect being improved using a graph model to process the graph.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, the implementation of various components described above may be embodied in a hardware device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for a shared bicycle delivery and an operation area planning in a smart city, implemented based on a hardware device of a management platform of an Internet of Things system for a shared bicycle delivery and an operation area planning in a smart city, wherein the Internet of Things system for the shared bicycles delivery and the operation area planning in the smart city further includes a user platform, a service platform, a sensor network platform, and an object platform; the user platform is a user-oriented service interface; the object platform is configured as a monitoring device, the object platform includes object sub-platforms corresponding to different target areas, and each object sub-platform is implemented by the monitoring device or a sensing device; wherein the service platform includes a plurality of service sub-platforms, and the different target areas correspond to different service sub-platforms;

the management platform includes a general management platform database and a plurality of management sub-platforms;

the sensor network platform includes a plurality of sensor network sub-platforms, the different target areas correspond to different sensor network sub-platforms, and the different sensor network sub-platforms correspond to different management sub-platforms; and a reference information of people flow in a target area and historical data of shared bicycles in a reference area are obtained based on the object platform and uploaded to a corresponding management sub-platform based on a sensor network sub-platform corresponding to the target area;

the method comprising:

obtaining the reference information of people flow in at least one target area, determining a predicted people flow in the at least one target area at a target time based on the reference information of people flow, and determining a demand quantity for the shared bicycles based on the predicted people flow; wherein the determining a predicted people flow in the at least one target area at a target time based on the reference information of people flow includes: determining the predicted people flow in the at least one target area at the target time through a first prediction model based on the reference information of people flow, wherein the first prediction model is a machine learning model;

obtaining the historical data of shared bicycles in a plurality of reference areas, and predicting a variation quantity of shared bicycles in the at least one target area at the target time based on the historical data of shared bicycles; wherein the predicting a variation quantity of shared bicycles in the at least one target area at the target time based on the historical data of shared bicycles includes:

constructing an operation map based on the at least one target area, the plurality of reference areas, roads connecting the at least one target area and the plurality of reference areas, roads interconnecting the plurality of reference areas, and the historical data of shared bicycles; and determining, by processing the operation map based on a second prediction model, the variation quantity of shared bicycles in the at least one target area at the target time, wherein the second prediction model includes at least one of a Graph Neural Network (GNN) model, a Graph Convolution Networks (GCN) model, a Graph Attention Networks (GAN)

model, or other custom models; wherein the second prediction model is obtained through training based on second training samples and second labels, the second training samples are a plurality of sample operation maps constructed based on the historical data of shared bicycles at a plurality of first historical times, and the second labels are an actual variation quantity of shared bicycles corresponding to each sample operation map, which is the actual variation quantity of shared bicycles at a next historical time of each first historical time; the second labels are determined by processing historical road surveillance videos through an image recognition model; and the historical road surveillance videos are obtained through road surveillance devices; wherein the training of the second prediction model includes:
    inputting the second training samples into an initial second prediction model to obtain an initial variation quantity of shared bicycles,
    constructing a loss function based on the initial variation quantity of shared bicycle and the second labels, and
    updating parameters of the initial second prediction model through the loss function, and obtaining the second prediction model through parameter updating;
wherein the variation quantity of shared bicycles is positively related to a variation quantity of people flow, and the variation quantity of people flow is determined based on a historical people flow and the predicted people flow;
determining a delivery quantity of shared bicycles in the at least one target area at the target time based on the demand quantity for shared bicycles and the variation quantity of shared bicycles; and
transmitting the delivery quantity of shared bicycles in the target area at the target time to the service platform through the general management platform database, and uploading the delivery quantity of shared bicycles in the target area at the target time to the user platform based on the service platform.

2. The method of claim 1, wherein the method further includes obtaining real-time operation reference data of shared bicycles in the at least one target area and adjusting an operation area of shared bicycles at the target time based on the real-time operation reference data.

3. The method of claim 2, wherein the reference information of people flow includes at least one of popularity, weather information, social activity information, and an area type of the at least one target area;
    the historical data of shared bicycles includes at least one of a number of shared bicycles, a people flow, road environment data, and shared bicycle transfer data in the plurality of reference areas at the first historical time; and
    the real-time operation reference data includes at least one of environmental information, the weather information, policy information, time information, the social activity information, and user riding information of the at least one target area.

4. The method of claim 1, wherein the determining a predicted people flow in the at least one target area at a target time based on the reference information of people flow includes:

determining a reference information sequence of people flow based on the reference information of people flow of a plurality of target areas in the at least one target area;
    outputting a predicted people flow sequence through the first prediction model based on the reference information sequence of people flow, wherein each element in the predicted people flow sequence corresponds to each target area in the plurality of target areas one to one.

5. The method of claim 1, wherein the first prediction model includes a people flow prediction layer and a demand quantity prediction layer:
    the people flow prediction layer is configured to process the reference information of people flow to determine the predicted people flow; and
    the demand quantity prediction layer is configured to process the predicted people flow to determine the demand quantity for shared bicycles in the at least one target area; wherein the people flow prediction layer and the demand quantity prediction layer are obtained through joint training based on fourth training samples and fourth labels, the fourth training samples are reference information of people flow in the at least one target area at a second historical time, and fourth labels are an actual demand quantity for the shared bicycles in the at least one target area at the second historical time; wherein the joint training includes:
    inputting the fourth training samples into an initial people flow prediction layer to obtain an initial predicted people flow in the at least one target area at the second historical time;
    inputting the initial predicted people flow in the at least one target area at the second historical time into an initial demand quantity prediction layer to obtain an initial demand quantity for shared bicycles in the at least one target area at the second historical time;
    constructing a loss function based on the initial demand quantity for shared bicycles and the fourth labels, and updated parameters of the initial people flow prediction layer and the initial demand quantity prediction layer synchronously; and
    obtained the people flow prediction layer and the demand quantity prediction layer through parameter updating.

6. The method of claim 1, wherein the operation map takes the at least one target area and the plurality of reference areas as nodes and the roads as edges, the edges being directed edges, and directions of the edges corresponding to flow directions of shared bicycles; node features include a number of shared bicycles and a people flow at the first historical time; and edge features include shared bicycle transfer data and road environment data at the first historical time.

7. The method of claim 2, wherein the adjusting an operation area of shared bicycles at the target time based on the real-time operation reference data includes:
    determining an adjustment priority of operation area based on the real-time operation reference data;
    determining an adjustment strategy of operation area based on the adjustment priority of operation area; and
    adjusting the operation area of shared bicycles at the target time based on the adjustment strategy of operation area.

8. The method of claim 7, wherein the real-time operation reference data further includes the predicted people flow and the variation quantity of shared bicycles; and the adjusting an operation area of shared bicycles at the target time based on the real-time operation reference data includes:
obtaining the predicted people flow and the variation quantity of shared bicycles in real time;
determining a weighted summation result by performing a weighted summation on the predicted people flow and the variation quantity of shared bicycles;
determining the adjustment strategy of operation area based on the weighted summation result; and
adjusting the operation area of shared bicycles at the target time based on the adjustment strategy of operation area.

9. An Internet of Things system for a shared bicycle delivery and an operation area planning in a smart city, comprising a user platform, a service platform, a management platform, a sensor network platform, and an object platform; wherein the user platform is a user-oriented service interface; the object platform is configured as a monitoring device, the object platform includes object sub-platforms corresponding to different target areas, and each object sub-platform is implemented by the monitoring device or a sensing device;
the service platform includes a plurality of service sub-platforms, and different target areas correspond to different service sub-platforms;
the management platform includes a general management platform database and a plurality of management sub-platforms, wherein each of the plurality of management sub-platforms corresponds to each of the different target areas;
the sensor network platform includes a plurality of sensor network sub-platforms, and each of the plurality of sensor network sub-platforms corresponds to the each of the different target areas;
the monitoring device of the object platform is configured to obtain reference information of people flow in a target area and historical data of shared bicycles in a reference area, and transmit the reference information and the historical data to a corresponding management sub-platform based on a sensor network sub-platform corresponding to the target area;
hardware devices of the management sub-platforms are configured to determine a predicted people flow in the target area at a target time based on the reference information of people flow, and determine a demand quantity for shared bicycles based on the predicted people flow; determine a variation quantity of shared bicycles in the target area at the target time based on the historical data of shared bicycles; determine a delivery quantity of shared bicycles based on the demand quantity for shared bicycles and the variation quantity of shared bicycles; and transmit the delivery quantity of shared bicycles to the service platform based on the general management platform database;
wherein to determine a predicted people flow in the at least one target area at a target time based on the reference information of people flow, the hardware devices of the management sub-platforms are further configured to:
determine the predicted people flow in the at least one target area at the target time through a first prediction model based on the reference information of people flow, wherein the first prediction model is a machine learning model;
wherein to predict a variation quantity of shared bicycles in the at least one target area at the target time based on the historical data of shared bicycles, the hardware devices of the management sub-platforms are further configured to:
construct an operation map based on the at least one target area, the plurality of reference areas, roads connecting the at least one target area and the plurality of reference areas, roads interconnecting the plurality of reference areas, and the historical data of shared bicycles; and
determine, by processing the operation map based on a second prediction model, the variation quantity of shared bicycles in the at least one target area at the target time, wherein the second prediction model includes at least one of a Graph Neural Network (GNN) model, a Graph Convolution Networks (GCN) model, a Graph Attention Networks (GAN) model, or other custom models;
wherein the second prediction model is obtained through training based on second training samples and second labels, the second training samples are a plurality of sample operation maps constructed based on the historical data of shared bicycles at a plurality of first historical times, and the second labels are an actual variation quantity of shared bicycles corresponding to each sample operation map, which is the actual variation quantity of shared bicycles at a next historical time of each first historical time; the second labels are determined by processing historical road surveillance videos through an image recognition model; and the historical road surveillance videos are obtained through road surveillance devices; wherein the training of the second prediction model includes:
inputting the second training samples into an initial second prediction model to obtain an initial variation quantity of shared bicycles,
constructing a loss function based on the initial variation quantity of shared bicycle and the second labels, and
updating parameters of the initial second prediction model through the loss function, and obtaining the second prediction model through parameter updating;
wherein the variation quantity of shared bicycles is positively related to a variation quantity of people flow, and the variation quantity of people flow is determined based on a historical people flow and the predicted people flow; and
a hardware device of the service platform is configured to transmit the delivery quantity of shared bicycles to the user platform.

10. The Internet of Things system of claim 9, wherein the management platform is configured to obtain real-time operation reference data of shared bicycles in the at least one target area and adjust an operation area of shared bicycles at the target time based on the real-time operation reference data.

11. The Internet of Things system of claim 9, wherein the hardware devices of the management sub-platforms are further configured to:
determine a reference information sequence of people flow based on the reference information of people flow of a plurality of target areas;
output a predicted people flow sequence through the first prediction model based on the reference information sequence of people flow, wherein each element in the predicted people flow sequence corresponds to each target area in the plurality of target areas one-to-one.

12. The Internet of Things system of claim 9, wherein the first prediction model includes a people flow prediction layer and a demand quantity prediction layer;
   the people flow prediction layer is configured to process the reference information of people flow to determine the predicted people flow; and
   the demand quantity prediction layer is configured to process the predicted people flow to determine the demand quantity for shared bicycles in the at least one target area; wherein the people flow prediction layer and the demand quantity prediction layer are obtained through joint training based on fourth training samples and fourth labels, the fourth training samples are reference information of people flow in the at least one target area at a second historical time, and fourth labels are an actual demand quantity for the shared bicycles in the at least one target area at the second historical time; wherein the joint training includes: inputting the fourth training samples into an initial people flow prediction layer to obtain an initial predicted people flow in the at least one target area at the second historical time; inputting the initial predicted people flow in the at least one target area at the second historical time into an initial demand quantity prediction layer to obtain an initial demand quantity for shared bicycles in the at least one target area at the second historical time; constructing a loss function based on the initial demand quantity for shared bicycles and the fourth labels, and updated parameters of the initial people flow prediction layer and the initial demand quantity prediction layer synchronously; and obtained the people flow prediction layer and the demand quantity prediction layer through parameter updating.

13. The Internet of Things system of claim 10, wherein the management platform is further configured to:
   determine an adjustment priority of operation area based on the real-time operation reference data;
   determine an adjustment strategy of operation area based on the adjustment priority of operation area; and
   adjust the operation area of shared bicycles at the target time based on the adjustment strategy of operation area.

14. The Internet of Things system of claim 13, wherein the real-time operation reference data further includes the predicted people flow and the variation quantity of shared bicycles; and the management platform is further configured to:
   obtain the predicted people flow and the variation quantity of shared bicycles in real time;
   determine a weighted summation result by performing a weighted summation on the predicted people flow and the variation quantity of shared bicycles;
   determine the adjustment strategy of operation area based on the weighted summation result; and
   adjust the operation area of shared bicycles at the target time based on the adjustment strategy of operation area.

15. A non-transitory computer-readable storage medium storing computer instructions, wherein after reading the computer instructions in the storage medium, a computer executes the method for the shared bicycle delivery and the operation area planning in the smart city in claim 1.

16. The method of claim 1, wherein the second prediction model includes a first prediction layer and a second prediction layer; the first prediction layer is used to process the operation map to determine a first variation quantity of shared bicycles in the at least one target area at the target time; the second prediction layer is used to process the first variation quantity of shared bicycles and the variation quantity of people flow to determine a second variation quantity of shared bicycles in the at least one target area at the target time; wherein the first prediction layer is a Graph Neural Network (GNN) model, and the second prediction model is a Deep Neural Networks (DNN) model;
   wherein the first prediction layer and the second prediction layer are obtained through jointly training based on sixth training samples and sixth labels, the sixth training samples include the plurality of sample operation maps constructed based on historical data of shared bicycles of a plurality of first historical time nodes and a sample variation quantity of people flow, and the sixth labels include actual variation quantity of shared bicycles in the target area at each first historical time node;
   wherein the joint training includes:
      inputting the sample operation maps into an initial first prediction layer to obtain the first variation quantity of shared bicycles; and inputting the first variation quantity of shared bicycles into an initial second prediction layer with the sample variation quantity of people flow to obtain the second variation quantity of shared bicycles;
      constructing a loss function based on the sixth labels and the second variation quantity of shared bicycles outputted by the second prediction layer, and updating the initial first prediction layer and the initial second prediction layer synchronously; and
      obtaining the first prediction layer and the second prediction layer through parameter updating.

17. The Internet of Things system of claim 9, wherein the second prediction model includes a first prediction layer and a second prediction layer; the first prediction layer is used to process the operation map to determine a first variation quantity of shared bicycles in the at least one target area at the target time; the second prediction layer is used to process the first variation quantity of shared bicycles and the variation quantity of people flow to determine a second variation quantity of shared bicycles in the at least one target area at the target time; wherein the first prediction layer is a Graph Neural Network (GNN) model, and the second prediction model is a Deep Neural Networks (DNN) model;
   wherein the first prediction layer and the second prediction layer are obtained through jointly training based on sixth training data samples and sixth labels, the sixth training samples include the plurality of sample operation maps constructed based on historical data of shared bicycles of a plurality of first historical time nodes and a sample variation quantity of people flow, and the sixth labels include actual variation quantity of shared bicycles in the target area at each first historical time node;
   wherein the joint training includes:
   inputting the sample operation maps into an initial first prediction layer to obtain the first variation quantity of shared bicycles; and inputting the first variation quantity of shared bicycles into an initial second prediction layer with the sample variation quantity of people flow to obtain the second variation quantity of shared bicycles;
   constructing a loss function based on the sixth labels and the second variation quantity of shared bicycles outputted by the second prediction layer, and updating the initial first prediction layer and the initial second prediction layer synchronously; and obtaining the trained first prediction layer and the trained second prediction layer through parameter updating.

\* \* \* \* \*